US006763780B2

(12) United States Patent
Place

(10) Patent No.: US 6,763,780 B2
(45) Date of Patent: Jul. 20, 2004

(54) FILL LEVEL INDICATOR FOR AGRICULTURAL MATERIAL BIN

(76) Inventor: Randal G. Place, 21834 Conant Rd., Wapakoneta, OH (US) 45895

(*) Notice: Subject to any disclaimer, the term of this patent is extended or adjusted under 35 U.S.C. 154(b) by 0 days.

(21) Appl. No.: 10/113,385

(22) Filed: Mar. 29, 2002

(65) Prior Publication Data

US 2003/0183151 A1 Oct. 2, 2003

(51) Int. Cl.[7] ............................................. G01F 23/30
(52) U.S. Cl. ........................ 116/228; 116/110; 73/322
(58) Field of Search ........................... 116/228, 1, 71, 116/109, 110, 200, 209, 227, 281, 283; 99/342, 343; 73/314, 322, 323; 340/623

(56) References Cited

U.S. PATENT DOCUMENTS

| | | | | |
|---|---|---|---|---|
| 595,320 A | * | 12/1897 | Long ............................. | 73/322 |
| 1,116,934 A | * | 11/1914 | Seltzer et al. ................ | 116/109 |
| 1,173,117 A | * | 2/1916 | Obermann .................... | 73/322 |
| 1,467,373 A | | 9/1923 | Gowin | |
| 1,642,656 A | * | 9/1927 | Hull ............................. | 73/322 |
| 1,646,317 A | * | 10/1927 | Rein ............................. | 73/322 |
| 1,778,840 A | * | 10/1930 | Wale ............................. | 73/322 |
| 2,449,915 A | | 9/1948 | Stadler | |
| 2,565,423 A | * | 8/1951 | Evans ............................. | 73/322 |
| 2,840,034 A | | 6/1958 | Danias | |
| 3,630,083 A | * | 12/1971 | Gorans ......................... | 73/294 |
| 3,880,109 A | | 4/1975 | Festa | |
| 4,019,659 A | | 4/1977 | Deneen | |
| 4,041,480 A | | 8/1977 | Boyle | |
| 4,170,136 A | * | 10/1979 | Martineau .................... | 73/322 |
| 4,412,447 A | * | 11/1983 | McMahan ...................... | 73/73 |
| 4,465,211 A | | 8/1984 | van der Lely et al. | |
| 4,936,245 A | | 6/1990 | Christianson | |
| 4,977,851 A | * | 12/1990 | Anderson .................... | 116/209 |
| 5,588,779 A | * | 12/1996 | Merrett ......................... | 405/54 |
| 5,603,282 A | | 2/1997 | Tsipris | |
| 6,523,405 B1 | * | 2/2003 | Mann ........................... | 73/308 |
| 2002/0029634 A1 | * | 3/2002 | Jahn .............................. | 73/323 |

* cited by examiner

Primary Examiner—Christopher W. Fulton
Assistant Examiner—Amy R. Cohen
(74) Attorney, Agent, or Firm—Baker & Daniels

(57) ABSTRACT

A fill level indicator assembly for an agricultural material bin such as a seed dispensing hopper. The assembly includes an elongate sighting member which provides a water impermeable cover over an indicator opening in the bin cover and has a transparent portion providing visual access to the interior of the sighting member. An indicator rod extends through the indicator opening and has a distinctive marking located near one end. The opposite end of the indicator member has a foot which engages the agricultural material within the bin. Gravity causes the indicator member to lower as the quantity of agricultural material within the bin is depleted. As the indicator member lowers, the distinctive marking within the sighting member is also lowered thereby providing a visual indication of the quantity of material remaining in the bin.

4 Claims, 2 Drawing Sheets

FIG_1

FILL LEVEL INDICATOR FOR AGRICULTURAL MATERIAL BIN

BACKGROUND OF THE INVENTION

The present invention relates to fill level indicators and more specifically to a fill level indicator used with an agricultural material bin such as a seed hopper.

Planters having seed hoppers for dispensing seed are commonly used to plant crops. The seed hoppers must periodically be refilled during the planting process and, for efficient planting operations, it is advantageous to be able to track the fill level of the seed hoppers without having to stop the planting process and visually inspect the interior of the seed hoppers. A variety of different devices for indicating the fill level of the seed hoppers which allow the fill level of the seed hoppers to be determined without stopping the planting process are known in the art. An improved, relatively inexpensive fill level indicator, however, is desirable.

SUMMARY OF THE INVENTION

The present invention provides a relatively inexpensive fill level indicator for an agricultural material bin such as a seed hopper.

The invention comprises, in one form thereof, a fill level indicator assembly for attachment to a bin for dispensing agricultural material. The assembly includes a bin cover removeably securable to an agricultural material bin and an elongate sighting member attached to the bin cover over a indicator opening in the bin cover, extending outwardly from the bin cover and providing a substantially water impermeable cover preventing the entry of water into the bin through the indicator opening. At least a portion of the sighting member is transparent and allows visual access to the elongate interior volume defined within the sighting member. An elongate indicator member extends through the indicator opening in the cover and has a first end disposed within the elongate interior volume of the sighting member and has a visually distinctive marking proximate the first end. The second end of the indicator member is opposite the first end and has a foot attached thereto. The foot has a substantially planar surface which is oriented substantially perpendicular to the indicator member and faces the agricultural material containing volume defined by the bin when the cover is attached to the bin. Movement of the indicator member relative to the cover repositions the distinctive marking within the sighting member and also repositions the planar surface of the foot relative to the interior surface of the cover member. The planar surface of the foot is adapted to engage the agricultural material disposed within the bin at the upper boundary of the material within the bin and gravitational forces urge the planar surface into contact with the material contained within the bin when the cover is attached to the bin. Thus, as the quantity of agricultural material within the bin is reduced, the distinctive marking is repositioned within the sighting member and provides a visual indication of the quantity of agricultural material contained within the bin.

In alternative forms of the invention, the distinctive marking may be formed by attaching light reflective tape to the indicator member. The indicator member may also include a retention member for inhibiting the removal of the first end of the indicator member from the elongate volume defined within the sighting member.

In other alternative forms of the invention, the sighting member may be formed with a transparent cylindrical tube having a cap attached to its distal end. The sighting member may also be attached to a mounting plate which is then secured to the bin cover to thereby attach the sighting member to the bin cover over the indicator opening.

An advantage of the present invention is that it provides a relatively inexpensive and easily maintained device.

Another advantage is when it utilizes a highly light reflective distinctive marking, it allows the operator to easily check the fill level of the bin even in low light conditions.

Yet another advantage is that it maintains the water impermeability of the bin and prevents water from entering the bin and potentially damaging the agricultural materials contained therein.

BRIEF DESCRIPTION OF THE DRAWINGS

The above mentioned features of this invention, and the manner of attaining them, will become more apparent and the invention itself will be better understood by reference to the following description of an embodiment of the invention taken in conjunction with the accompanying drawings, wherein.

Figure 1:
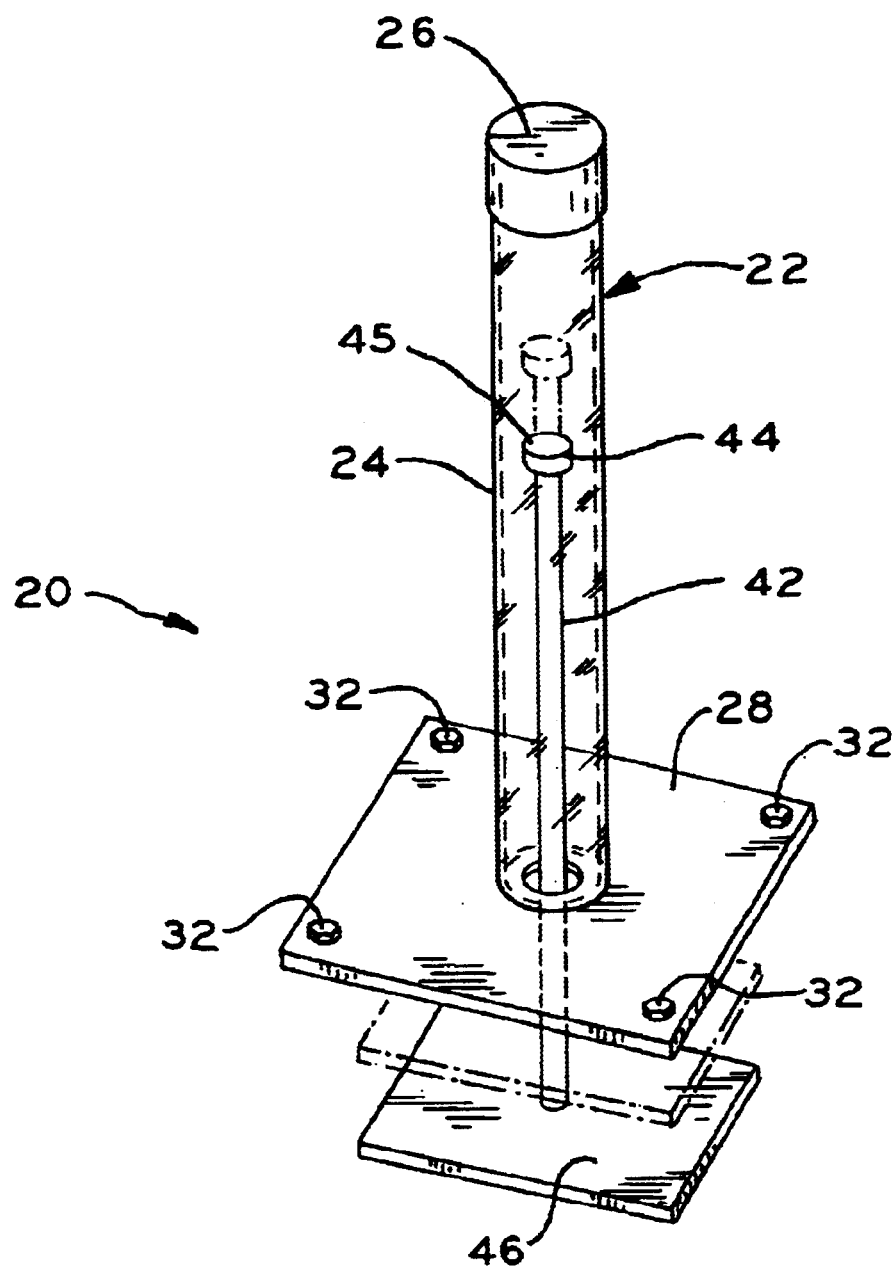
FIG. 1 is a perspective view of a fill level indicator assembly in accordance with the present invention.

Corresponding reference characters indicate corresponding parts throughout the several views. Although the drawings represent an embodiment of the present invention, the embodiment described below is set out as an exemplification of the invention and is not intended to be exhaustive or to be construed as limiting the scope of the invention to the precise form disclosed.

DESCRIPTION OF THE PRESENT INVENTION

Figure 2:
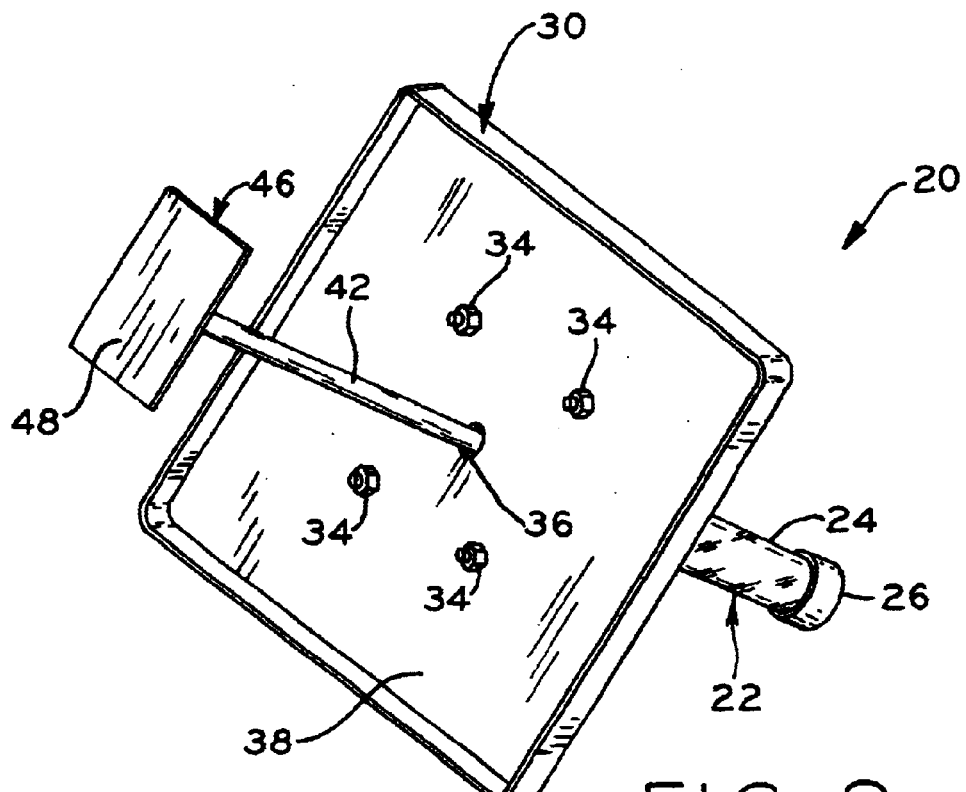
FIG. 2 is a perspective view of a fill level indicator attached to a bin cover.

Referring to the drawings, there is shown a fill level indicator 20. As shown in FIG. 1, the fill level indicator includes an elongate sighting member 22. In the illustrated embodiment, the sighting member 22 comprises a transparent cylindrical tube 24 and cap 26 secured to the distal end of the tube 24. The sighting member 22 may be relatively inexpensively manufactured by using commonly available plastic piping materials to form the cylindrical tube 24 and cap 26. In the embodiment illustrated in FIG. 1, the cylindrical tube 24 is attached to a mounting plate 28. Tube 24 may be attached to mounting plate 28 using adhesives or be integrally formed therewith. Mounting plate 28 is secured to a removable bin cover 30. As shown in FIGS. 1 and 2, the mounting plate may be attached using threaded bolts 32 and nuts 34. If necessary, a sealant may be used to seal the openings in bin cover 30 through which the bolts 32 extend. Alternatively, mounting plate 28 may be attached to bin cover 30 using adhesives.

The bin cover includes an indicator opening 36 which extends from the bottom interior surface 38 of bin cover 30 to the upper exterior surface 40 of bin cover 30. An elongate indicator rod 42 extends through indicator opening 36. If a mounting plate 28 is used to secure the sighting member 22 to bin cover 30, the mounting plate 28 will also include an opening to permit the indicator rod 42 to extend therethrough. The mounting plate 28 and sighting member 22 cover opening 36 and substantially prevent the entry of water into the bin on which cover 30 is mounted through opening 36. Preventing water from entering the bin or seed hopper is advantageous since planting operations may oftentimes be disrupted by rain and it is preferable that water not enter the bin where it might rust the bin or cause damage by exposing the contents of the bin to water while the contents are still contained in the bin.

Figure 3:
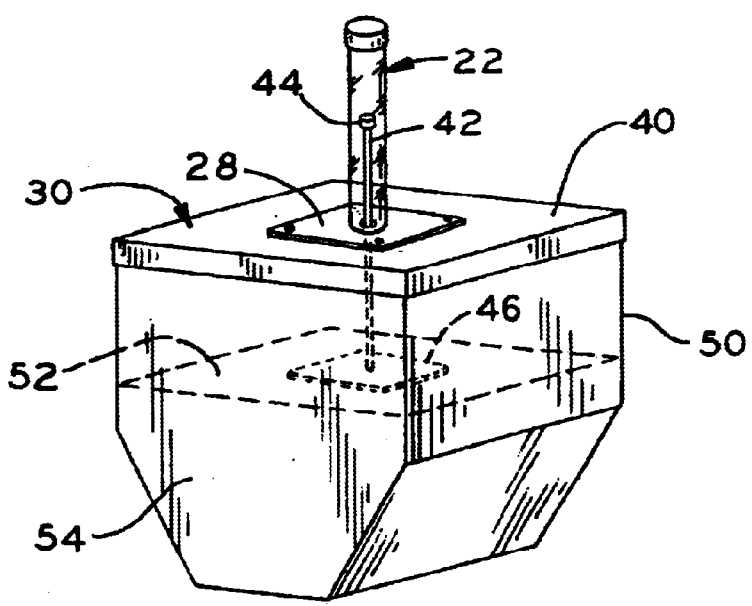
FIG. 3 is a perspective view of a fill level indicator installed on a seed hopper.

The indicator rod 42 may be formed by a length of commonly available plastic piping made from a material such as PVC or plexiglass. In the illustrated embodiment, indicator rod 42 is an opaque cylindrical tube. Near a first end of the indicator rod 42, a visually distinctive marking 44 is provided. In the illustrated embodiment distinctive marking 44 is formed by wrapping a length of reflective tape around a cap 45 attached to the end of the indicator rod 42. Alternatively, distinctive marking 44 may be provided on indicator rod 42 by marking the rod 42 with a paint or other material. As illustrated in FIGS. 1 and 3, the distinctive marking 44 can be seen through the sighting member 22. Although it is advantageous to provide a tube 24 which is completely transparent, alternative sighting members 22 may be used provided that such sighting members include a transparent portion which provides visual access to the distinctive marking 44. The distinctive marking 44 is advantageously formed by using a light reflective material so that it may be more easily seen in low light conditions. For example, if a planter is being used at night, the fill level indicator 20 may be attached to a seed hopper on the planter and the use of a reflective material to form distinctive marking 44 can allow the marking 44 to reflect the light of the tractor pulling the planter so that the operator of the tractor may more easily see distinctive marking 44. Cap 45 on the distal end of indicator rod 42 may also function as a retention member which inhibits withdrawal of the distal end of rod 42 from the interior volume of the sighting member 22 through indicator opening 36. If cap 45 is attached after rod 42 is inserted through opening 36 and has a larger diameter than opening 36, the cap 45 will prevent rod 42 from being withdrawn. If cap 45 is similar in size to opening 36 but still passable therethrough, it may still inhibit removal of rod 42 through opening 36. By inhibiting or preventing the removal of rod 42 through opening 36, the handling of cover bin 30 is facilitated.

A foot member 46 is attached to the opposite, second end of rod 42 and includes a substantially planar surface 48. Planar surface 48 is oriented substantially perpendicular to the length of rod 42 and, when cover bin 30 is secured to a bin 50 as shown in FIG. 3, the planar surface 48 faces downwardly and gravity urges surface 48 into contact with the upper boundary 52 of the material contained within bin 50. As the volume 54 of the agricultural material, represented by dashed lines in FIG. 3, within bin 50 is depleted, the vertical position of upper boundary 52 will descend and the vertical positions of planar surface 48 and distinctive marking 44 will also descend. The resultant relative lowering of distinctive marking 44 within sighting member 22 is visible through sighting member 22 and the vertical position of marking 44 provides an indication of the quantity of material disposed in bin 50. In alternative embodiments, markings could be provided on sighting member 22 to correspond to various fill levels within bin 50.

In the illustrated embodiment, bin 50 represents a seed hopper which would be located on a planter as is well known in the art. For example, John Deere manufactures planters which have seed hoppers mounted thereon. Seed hoppers on such planters typically have removable covers, manufactured out of plastic or metal materials, which can be adapted for use with the present invention by placing a hole in the seed hopper cover to form an indicator opening 36 and then mounting the remainder of the indicator assembly 20 to the cover. Planters typically have more than one seed hopper, however, if the seed hoppers are all initially filled to a common height and dispense seed at a common rate, the use of one fill level indicator assembly will be sufficient to predict when the seed hoppers will be depleted. Alternatively, if the seed hoppers will not be simultaneously depleted, the fill level indicator may advantageously be placed on the hopper that will first be depleted.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains. Accordingly, the scope of the invention should be determined not by the illustrated embodiments but by the following claims and their legal equivalents.

What is claimed is:

1. A method of planting seed, said method comprising:

attaching a fill level indicator to a seed hopper having a bin with a removable bin cover wherein the bin defines an agricultural material containing volume for containing a variable quantity of agricultural material defining an agricultural material volume upper boundary having a vertical position which varies with changes in the variable quantity of agricultural material contained within the bin, the removable bin cover removably securable to the bin, the bin cover having an interior surface and an exterior surface and defining an indicator opening extending through said cover between the interior and exterior surfaces, the indicator opening being positioned above the agricultural material containing volume when the bin cover is secured to the bin; an elongate sighting member secured to the bin cover over the indicator opening and extending outwardly from the exterior surface of the bin cover, the sighting member having a transparent portion providing visual access to an elongate volume defined within the sighting member, the sighting member providing a substantially water impermeable cover and inhibiting entry of water into the bin through the indicator opening; and an elongate indicator member extending through the indicator opening and having a first end and an opposite second end wherein the first end is disposed within the elongate volume defined by the sighting member, the elongate indicator having a visually distinctive marking proximate the first end, the indicator member is movable relative to the bin cover wherein relative movement of the indicator member repositions the distinctive marking within the sighting member, the second end having a foot defining a substantially planar surface oriented substantially perpendicular to the elongate indicator member, the planar surface facing the agricultural material containing volume when the bin cover is secured to the bin, the relative movement of the indicator member repositioning the planar surface relative to the bin cover interior surface, the planar surface is adapted to engage agricultural material disposed within the bin, gravitational forces urge the planar surface into contact with agricultural material disposed within the bin and position the planar surface at the agricultural material volume upper boundary when the cover is secured to the bin; reducing the quantity of agricultural material within the bin repositioning the distinctive marking within the sighting member; and refilling the bin during planting operations when the visually distinctive marking descends to a position indicating that the bin is depleted.

2. The method of claim 1 wherein the distinctive marking is a light reflective marking and the method further comprises reflecting light generated by a tractor pulling the seed hopper with the distinctive marking to facilitate the detection of the distinctive marking.

3. The method of claim 1 further comprising providing the first end of the indicator member with a retention member for inhibiting the removal of the first end from the elongate volume.

4. The method of claim 3 wherein the distinctive marking is a light reflective marking and the method further comprises reflecting light generated by a tractor pulling the seed hopper with the distinctive marking to facilitate the detection of the distinctive marking.

* * * * *